(12) United States Patent
Hashimoto et al.

(10) Patent No.: US 11,964,391 B2
(45) Date of Patent: Apr. 23, 2024

(54) ROBOT SYSTEM

(71) Applicant: KAWASAKI JUKOGYO KABUSHIKI KAISHA, Kobe (JP)

(72) Inventors: Yasuhiko Hashimoto, Kobe (JP); Shigetsugu Tanaka, Akashi (JP); Masayuki Kamon, Akashi (JP); Yoshihiko Maruyama, Osaka (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 582 days.

(21) Appl. No.: 17/265,007

(22) PCT Filed: Jul. 30, 2019

(86) PCT No.: PCT/JP2019/029782
§ 371 (c)(1),
(2) Date: Feb. 1, 2021

(87) PCT Pub. No.: WO2020/027106
PCT Pub. Date: Feb. 6, 2020

(65) Prior Publication Data
US 2021/0323151 A1    Oct. 21, 2021

(30) Foreign Application Priority Data
Jul. 31, 2018    (JP) .................................. 2018-143137

(51) Int. Cl.
*B25J 9/16*    (2006.01)
*B25J 3/04*    (2006.01)
*B25J 9/00*    (2006.01)

(52) U.S. Cl.
CPC ............... *B25J 9/1656* (2013.01); *B25J 3/04* (2013.01); *B25J 9/0081* (2013.01); *G05B 2219/36454* (2013.01); *G05B 2219/39001* (2013.01)

(58) Field of Classification Search
None
See application file for complete search history.

(56) References Cited

U.S. PATENT DOCUMENTS

| | | | | |
|---|---|---|---|---|
| 4,568,816 A | * | 2/1986 | Casler, Jr. .......... | G05B 19/4083 901/42 |
| 2007/0213873 A1 | * | 9/2007 | Ban ........................ | B25J 9/1656 700/245 |
| 2018/0243901 A1 | * | 8/2018 | Hashimoto ............ | B25J 9/1669 |

FOREIGN PATENT DOCUMENTS

| JP | S55-48594 A | 4/1980 |
|---|---|---|
| JP | H09-146624 A | 6/1997 |

(Continued)

*Primary Examiner* — Peter D Nolan
*Assistant Examiner* — Jacob Kent Besteman-Street
(74) *Attorney, Agent, or Firm* — Oliff PLC

(57) ABSTRACT

A robot system includes a robot body, a memory, an operation controlling module and a manipulator. When the robot body is located at a first position, the operation controlling module stops the robot body and receives a selecting manipulation of operation mode from the manipulator. When a correctable automatic mode is selected at the first position, the operation controlling module makes positional coordinates of a second position provided downstream of the first position in a moving direction, changeable from the second position in automatic operation information. When the positional coordinates of the second position are changed, the operation controlling module corrects the automatic operation information so that the robot body reaches the changed second position while retaining some of elements of the automatic operation information in the correctable automatic mode.

4 Claims, 9 Drawing Sheets

(56) References Cited

FOREIGN PATENT DOCUMENTS

| | | |
|---|---|---|
| JP | 2007-249267 A | 9/2007 |
| JP | 2013-71231 A | 4/2013 |
| WO | 2017/033356 A1 | 3/2017 |
| WO | WO-2017033356 A1 * | 3/2017 ............. A61B 34/32 |

* cited by examiner

ROBOT SYSTEM

TECHNICAL FIELD

The present disclosure relates to a robot system.

BACKGROUND ART

Conventionally, industrial robots automatically perform a repetitive work, such as welding, painting, assembling parts, and applying sealant, at a manufacturing site. In order to cause the robot to work, teaching is required, in which information necessary for the work is instructed to the robot and the robot stores the information. Methods for teaching the robot are, for example, a direct teaching in which a teaching person directly touches the robot to move it, a remote-control teaching using a teaching pendant, a teaching through programming, and a master-slave teaching. For example, Patent Document 1 discloses one example of the teaching in which a robotic arm is caused to memorize a path for performing a work through the direct teaching.

REFERENCE DOCUMENT OF CONVENTIONAL ART

Patent Document

[Patent Document 1] JP2013-071231A

DESCRIPTION OF THE DISCLOSURE

Problems to be Solved by the Disclosure

Meanwhile, a part of the operation taught to the robot may need to be changed for various reasons. For example, when a position of the work target of the robot is partially changed from a taught position due to a lot change of workpieces etc., the robot may fail to achieve the target work, or an accuracy of the work may degrade. Moreover, it may be found out after the teaching is finished that a problem may occur to a part of the work if performed based on teaching information initially created. In such a case, teaching is performed again to change the teaching information used for an automatic operation of the robot. However, teaching often requires technique of an expert and a lot of time and effort, thus being burdensome for the teaching person. The same applies to a case when partially changing the operation of the robot.

Therefore, one purpose of the present disclosure is to provide a robot system, capable of easily and appropriately correcting operation of a robot set in advance.

SUMMARY OF THE DISCLOSURE

A robot system according to one aspect of the present disclosure includes a robot body, a memory configured to store automatic operation information for causing the robot body to perform a given operation, an operation controlling module configured to control the operation of the robot body based on the automatic operation information, and a manipulator configured to generate corrective manipulation information based on a corrective manipulation for correcting the operation of the robot body under operation based on the automatic operation information. The operation controlling module selects, based on an input from the manipulator, an operation mode to be executed from a plurality of operation modes including an automatic mode in which the robot body is controlled based on the automatic operation information, and a correctable automatic mode in which the corrective manipulation information is acquired and the robot body is controlled to perform a corrected operation based on the corrective manipulation information. The memory stores corrected operation information based on the corrected operation as the next automatic operation information. The automatic operation information includes positional information on a first position on an operation path of the robot body, and a second position provided downstream of the first position in a moving direction and configured to serve as a reference position for the operation of the robot body. The operation controlling module is adapted to stop the robot body and receive a selecting manipulation of the operation mode from the manipulator when the robot body is located at the first position, make positional coordinates of the second position changeable from the second position in the automatic operation information when the correctable automatic mode is selected at the first position, and correct, when the positional coordinates of the second position are changed, the automatic operation information so that the robot body reaches the changed second position while retaining some of elements of the automatic operation information in the correctable automatic mode.

According to this configuration, the operation of the robot body can be corrected in real time based on the corrective manipulation by the manipulator during the operation of the robot body based on the automatic operation information. Moreover, only by the positional coordinates (changed positional coordinates) of the second position being specified, the operation of the robot body can be corrected so that the robot body reaches the specified second position while some of the elements in the original automatic operation information are retained. Since some elements of the original automatic operation information are retained, the robot body can be operated to locate at the desired second position while a principal motion of the robot body including tips for manipulation carried out by an expert during teaching, is succeeded or taken over. As a result, the operation of the robot body set in advance can be corrected easily and appropriately.

The second position may be set as a reference position for the robot body performing a given work to a given workpiece.

According to this configuration, even when the installed position of the workpiece is changed due to the lot change etc., the work position is changed while the principal motion of the robot body can be prevented from being changed. As a result, the operation efficiency of the robot body can be prevented from being degraded due to the positional adjustment.

The automatic operation information may include positional information on a third position located between the first position and the second position on the operation path in the moving direction. The operation controlling module may execute, when the positional coordinates of the second position are changed, a corrected-operational-section calculating processing in which an operation path in a given operational section from the third position on the operation path of the robot body based on the automatic operation information, is calculated. The corrected-operational-section calculating processing may include parallelly moving a given operational section from the third position and including the second position on the operation path of the robot body based on the automatic operation information, corresponding to the change in the second position.

According to this configuration, even when the positional coordinates of the second position are changed, the contour of the operation path of the robot body in the given operational section from the third position and including the second position, is reproduced. Thus, the principal motion of the robot body can be easily succeeded.

The robot body may include a slave arm, and the manipulator may include a master arm installed outside a work range of the slave arm.

Effect of the Disclosure

According to the present disclosure, a robot system capable of easily and appropriately correcting operation of a robot set in advance can be provided.

MODES FOR CARRYING OUT THE DISCLOSURE

Figure 1:
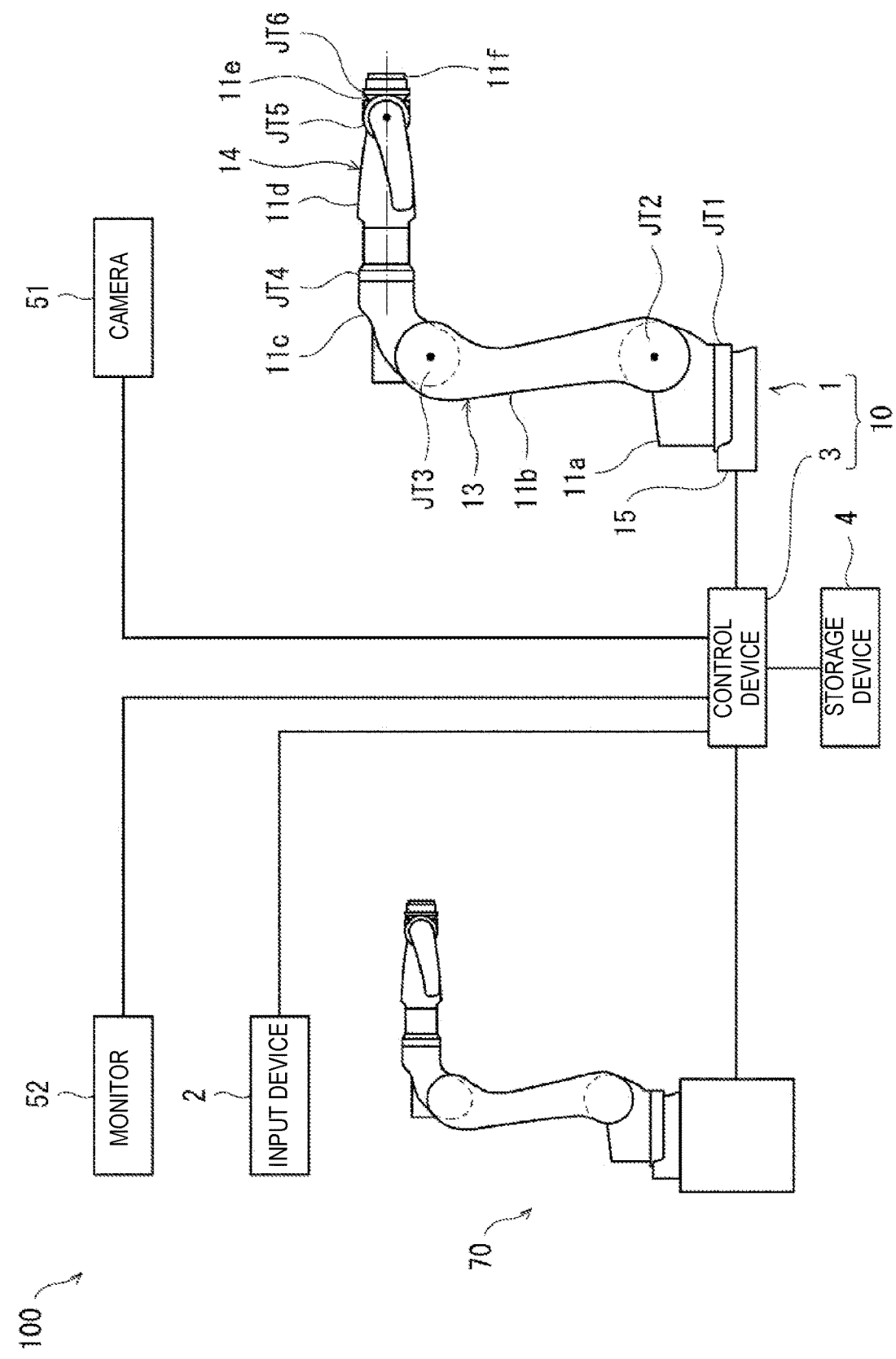
FIG. 1 is a schematic view illustrating a configuration of a robot system according to one embodiment.

Hereinafter, desirable embodiments of the present disclosure will be described with reference to the accompanying drawings. Note that, below, the same reference characters are assigned to the same or corresponding elements throughout the drawings to omit redundant description.

FIG. 1 is a schematic view illustrating a configuration of a robot system according to one embodiment. A robot system 100 of this embodiment is a system utilizing a master-slave robot. As illustrated in FIG. 1, the robot system 100 according to this embodiment is provided with a robot 10, an input device 2 including a master arm 70, and a storage device 4.

In the robot system 100, an operator located separately from a work range of a slave arm 1 (outside the work range) moves the master arm 70 to input a command, and the slave arm 1 operates corresponding to the command so as to perform a certain work. Moreover, in the robot system 100, the slave arm 1 can automatically perform a given work without the master arm 70 being manipulated by the operator.

Herein, an operation mode in which the slave arm 1 is operated in accordance with the command inputted via the master arm 70 is referred to as a "manual mode." In this manual mode, the operation of the slave arm 1 is controlled by a control device 3 without using automatic operation information stored in the storage device 4, but controlled based on manipulation information (operation command) received from the input device 2 which is manipulated by the operator. Note that the "manual mode" includes a case in which the operation of the slave arm 1 is partially corrected automatically while the slave arm 1 operates based on the command inputted by the master arm 70 being manipulated by the operator.

Moreover, an operation mode in which the slave arm 1 is operated in accordance with a task program set in advance is referred to as an "automatic mode." In this automatic mode, the operation of the slave arm 1 is controlled by the control device 3 based on the automatic operation information stored in the storage device 4.

Moreover, the robot system 100 according to this embodiment can correct the operation which was to be performed automatically, by reflecting the manipulation of the master arm 70 to the operation of the slave arm 1 under the automatic operation of the slave arm 1. Herein, an operation mode in which the slave arm 1 is operated in accordance with the task program set in advance while corrective manipulation information based on a corrective manipulation by the master arm 70 is reflectable to the operation of the slave arm 1 based on the automatic operation information, is referred to as a "correctable automatic mode." Note that the "automatic mode" is distinguished from the "correctable automatic mode" in that the manipulation by the master arm 70 is not reflected to the operation of the slave arm 1 when the operation mode to operate the slave arm 1 is the automatic mode.

(Robot 10)

The robot 10 is provided with the slave arm 1, an end effector (not illustrated) attached to a tip end of the slave arm 1, and the control device 3 which controls operation of the slave arm 1 and the end effector. The slave arm 1 is provided with a pedestal 15, an arm part 13 supported by the pedestal 15, and a wrist part 14 supported by a tip end of the arm part 13 and to which the end effector is attached. In this embodiment, the slave arm 1 and the end effector constitute a robot body.

As illustrated in FIG. 1, the slave arm 1 is an articulated robotic arm having a plurality of (e.g., three or more) joints JT1-JT6, and it is constituted by serially coupling a plurality of links 11a-11f. In more detail, in the first joint JT1, the pedestal 15 and a base-end part of the first link 11a are coupled to each other rotatably on an axis extending in the vertical direction. In the second joint JT2, a tip-end part of the first link 11a and a base-end part of the second link 11b are coupled to each other rotatably on an axis extending in the horizontal direction. In the third joint JT3, a tip-end part of the second link 11b and a base-end part of the third link 11c are coupled to each other rotatably on an axis extending in the horizontal direction. In the fourth joint JT4, a tip-end part of the third link 11c and a base-end part of the fourth link 11d are coupled to each other rotatably on an axis extending in the longitudinal direction of the fourth link 11d. In the fifth joint JT5, a tip-end part of the fourth link 11d and a base-end part of the fifth link 11e are coupled to each other rotatably on an axis perpendicular to the longitudinal direction of the link 11d. In the sixth joint JT6, a tip-end part of the fifth link 11e and a base-end part of the sixth link 11f are coupled to each other rotatably in a twistable manner. Further, a mechanical interface is provided to a tip-end part of the sixth link 11f. The end effector corresponding to the content of work is detachably attached to the mechanical interface.

The arm part 13 of the slave arm 1 is formed by a coupling body of the links and the joints comprised of the first joint JT1, the first link 11a, the second joint JT2, the second link 11b, the third joint JT3, and the third link 11c. Moreover, the wrist part 14 of the slave arm 1 is formed by a coupling body of the links and the joints comprised of the fourth joint JT4, the fourth link 11d, the fifth joint JT5, the fifth link 11e, the sixth joint JT6, and the sixth link 11f.

The joints JT1-JT6 are each provided with a drive motor M (see FIG. 3) as one example of an actuator which relatively rotates two members coupled through the joint. The drive motor M is, for example, a servomotor servo-controlled by the control device 3. Moreover, the joints JT1-JT6 are each provided with a rotation sensor E (see FIG. 3) which detects a rotational position of the drive motor M, and a current sensor C (see FIG. 3) which detects current for controlling the rotation of the drive motor M. The rotation sensor E is comprised of, for example, an encoder.

The control device 3 may be comprised of, for example, a processor (not illustrated) including a microcontroller, an MPU, a PLC (Programmable Logic Controller), or a logic circuit, and a memory (not illustrated) including a ROM and a RAM.

Figure 2:
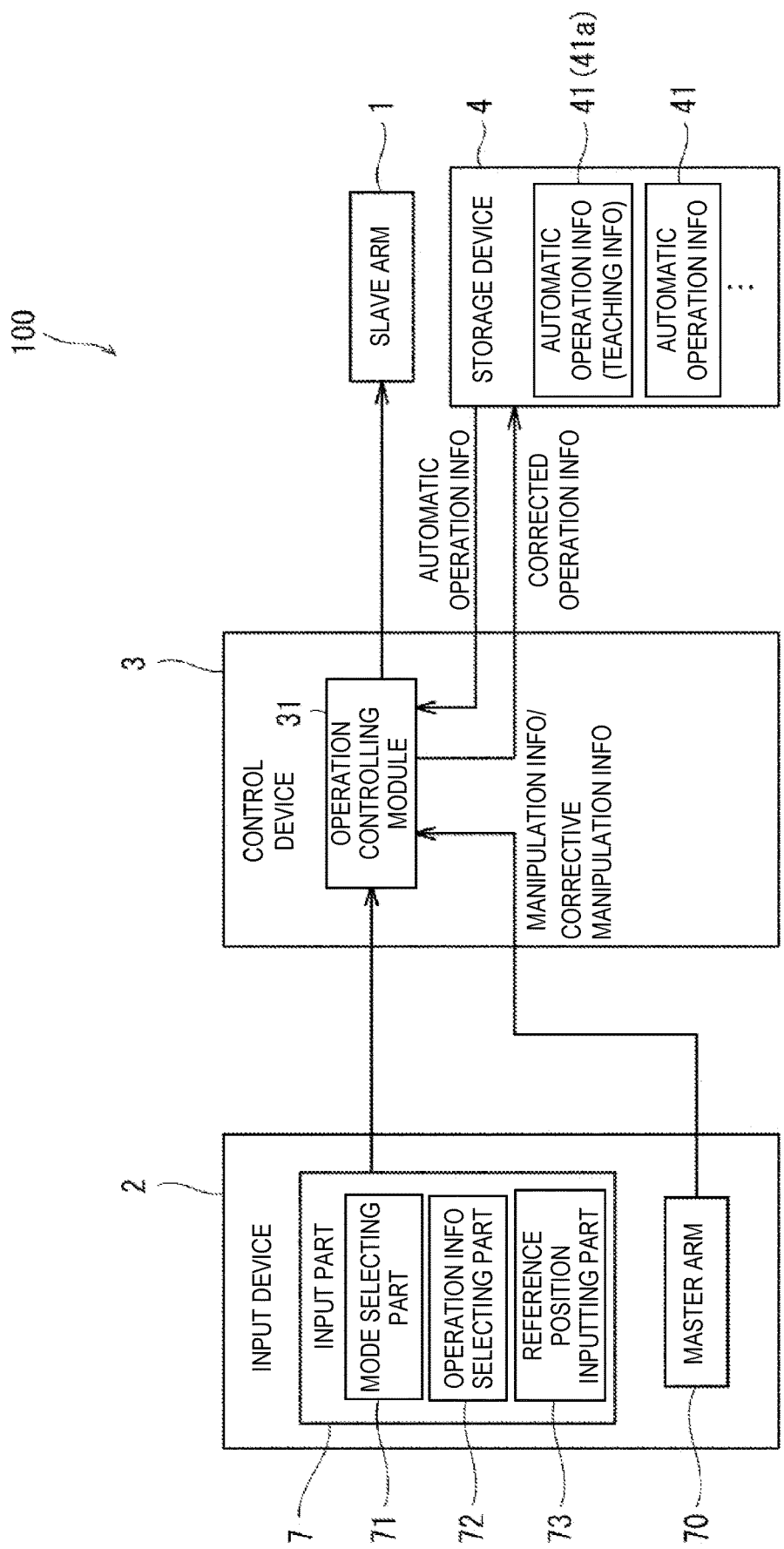
FIG. 2 is a schematic view illustrating a configuration of a control system of the robot system illustrated in FIG. 1.

FIG. 2 is a schematic view illustrating a configuration of a control system of the robot system 100 illustrated in FIG. 1. As illustrated in FIG. 2, the control device 3 includes an operation controlling module 31 as a functional block. This functional block can be implemented by, for example, the processor of the control device 3 reading and executing the program stored in the memory. The operation controlling module 31 controls the operation of the slave arm 1. The control of the operation of the slave arm 1 by the operation controlling module 31 will be described later in detail.

(Input Device 2)

The input device 2 is a device constituting a manipulator which is installed outside the work range of the slave arm 1, receives a manipulation instruction from the operator, and sends the received manipulation instruction to the control device 3. The input device 2 includes an input part 7 to which a given setting etc., is inputted, and the master arm 70. The input part 7 may be comprised of a switch, an adjustment knob, a control lever, an operation panel, or imaginary input buttons displayed on a display screen of a portable terminal (e.g., a tablet).

As illustrated in FIG. 2, the input part 7 includes a mode selecting part 71, an operation information selecting part 72, and a reference position inputting part 73. The mode selecting part 71 is selectable of the operation mode to operate the slave arm 1 from the automatic mode, the correctable automatic mode, and the manual mode by being operated by the operator. The operation information selecting part 72 is selectable of operation information used by the operation controlling module 31 when operating the slave arm 1 in the automatic mode or the correctable automatic mode, from a plurality of operation information for operating the slave arm 1. The reference position inputting part 73 is inputtable, by the operator, of a reference position (a second position described later) which serves as a reference for a given work.

Since a structure of the master arm 70 is similar to that of the slave arm 1, description of the structure of the master arm 70 is omitted. However, the structure of the master arm 70 may be dissimilar to that of the slave arm 1. The manipulation information is generated by the master arm 70 being moved, and the generated manipulation information is sent to the control device 3. In the robot system 100 according to this embodiment, when the manipulation information is sent to the control device 3 while the operation mode to operate the slave arm 1 is the manual mode, the slave arm 1 is controlled by the control device 3 to follow the movement of the master arm 70. When the manipulation information (corrective manipulation information) is sent to the control device 3 while the operation mode to operate the slave arm 1 is the correctable automatic mode, the automatic operation information is corrected based on the corrective manipulation information, and the operation of the slave arm 1 is controlled based on corrected operation information after the correction.

(Camera 51 and Monitor 52)

The robot system 100 further includes a camera 51 and a monitor 52. The camera 51 images a situation of the work performed by the slave arm 1, and the monitor 52 is used by the operator to confirm the situation of the work performed by the slave arm 1. The camera 51 is installed in a space where the slave arm 1 is disposed, and the monitor 52 is installed in a space where the master arm 70 is disposed. The operator manipulates the master arm 70 while watching the working situation of the slave arm 1 displayed on the monitor 52. The camera 51 and the monitor 52 are connected to each other via the control device 3, and the image information captured by the camera 51 is sent to the monitor 52 via the control device 3. However, the camera 51 and the monitor 52 may be connected to each other not via the control device 3, but connected directly or via other devices. The camera 51 and the monitor 52 may be wiredly or wirelessly connected to each other.

(Storage Device 4)

The storage device 4 is a readable and writable recording medium, and stores information as automatic operation information 41 which causes the slave arm 1 to automatically perform a given operation. The automatic operation information 41 is unnecessarily whole information required to cause the slave arm 1 to automatically perform the given operation, but may be partial information. Moreover, the automatic operation information 41 may be any information as long as it is related to the operation of the slave arm 1. For example, the automatic operation information 41 may be orbital information including time-series data, or may be path information representing postures of the slave arm 1 at discrete positions with a given time interval. The automatic operation information 41 may include a speed of the operation of the slave arm 1 along the path.

The storage device 4 stores at least one automatic operation information 41, and one of them is, for example, teaching information 41a stored through a teaching in which the slave arm 1 is operated to perform the given work. Although in this embodiment the automatic operation information 41 as the teaching information 41a is the information stored by manipulating the master arm 70 to instruct the slave arm 1 to operate, it is not limited to this, and may be information stored in any teaching method. For example, the automatic operation information 41 as the teaching information 41a may be information stored through the direct teaching. Note that although in the robot system 100 according to this embodiment the storage device 4 is provided separately from the control device 3, it may be provided integrally with the control device 3.

(Operation Control of Slave Arm 1)

Below, a control of the operation of the slave arm 1 by the operation controlling module 31 is described with reference to FIG. 2.

At least one of the automatic operation information 41 stored in the storage device 4 is sent to the operation controlling module 31 as the automatic operation information which causes the slave arm 1 to operate automatically. Moreover, the manipulation information generated through the manipulation of the master arm 70 is sent to the operation controlling module 31.

The operation controlling module 31 uses one of the automatic operation information and the manipulation information, or both of them, according to the operation mode selected by the mode selecting part 71.

When the operation mode selected through the mode selecting part 71 is the manual mode, the operation controlling module 31 uses the manipulation information. In detail, when the operation mode to operate the slave arm 1 is the manual mode, the operation controlling module 31 controls the operation of the slave arm 1 in accordance with the manipulation information (inputted command) sent through the manipulation of the master arm 70 without using the automatic operation information 41 stored in the storage device 4.

Moreover, when the operation mode selected through the mode selecting part 71 is the automatic mode, the operation controlling module 31 uses the automatic operation information. In detail, when the operation mode to operate the slave arm 1 is the automatic mode, the operation controlling module 31 controls the operation of the slave arm 1 based on the automatic operation information sent from the storage device 4 in accordance with the task program set in advance without using the manipulation information sent from the master arm 70.

Moreover, when the operation mode selected by the mode selecting part 71 is the correctable automatic mode, the operation controlling module 31 uses both of the automatic operation information and the manipulation information (corrective manipulation information). Note that when the operation mode is the correctable automatic mode and the corrective manipulation information is not sent to the operation controlling module 31, the operation controlling module 31 uses only the automatic operation information. In more detail, when the operation mode to operate the slave arm 1 is the correctable automatic mode and the corrective manipulation information is received during the automatic operation of the slave arm 1 using the automatic operation information, the operation controlling module 31 corrects the automatic operation information based on the received corrective manipulation information and controls the operation of the slave arm 1 based on the corrected operation information after the correction. Accordingly, the slave arm 1 performs the operation related to the automatic operation information, that is, performs the operation corrected from the operation which was to be performed automatically.

Figure 3:
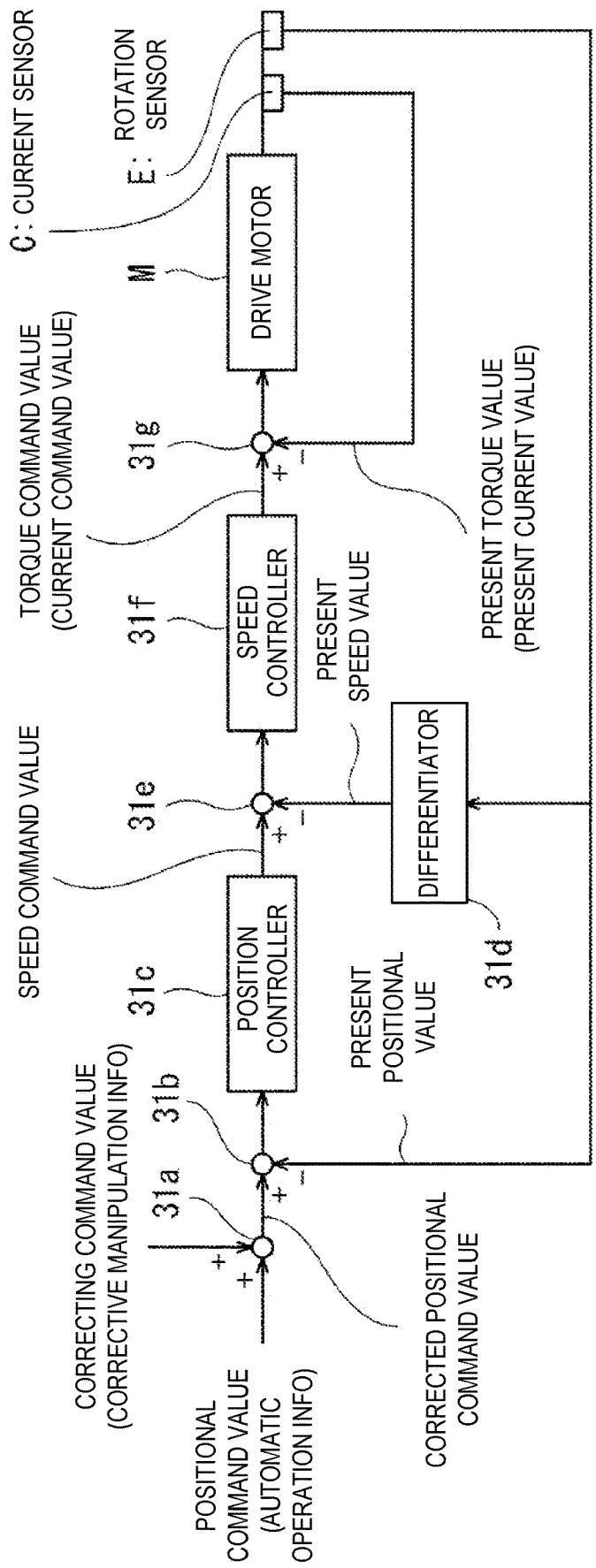
FIG. 3 is a view illustrating one example of a block diagram of a control system of an operation controlling module illustrated in FIG. 2.

Below, the correction of the operation of the slave arm 1 when the operation mode to operate the slave arm 1 is the correctable automatic mode, is described with reference to FIG. 3. FIG. 3 is a view illustrating one example of a block diagram of a control system of the operation controlling module 31 illustrated in FIG. 2. In this example, the automatic operation information and the corrective manipulation information are orbital information including time-series data, for example.

The operation controlling module 31 includes an adder 31a, subtractors 31b, 31e, and 31g, a position controller 31c, a differentiator 31d, and a speed controller 31f. The operation controlling module 31 controls a rotational position of the drive motor M of the slave arm 1 using a command value based on the automatic operation information and a command value based on the corrective manipulation information.

The adder 31a adds a correcting command value based on the corrective manipulation information to a positional command value based on the automatic operation information so as to generate a corrected positional command value. The adder 31a sends the corrected positional command value to the subtractor 31b.

The subtractor 31b subtracts a present positional value detected by the rotation sensor E from the corrected positional command value so as to generate an angular deviation. The subtractor 31b sends the generated angular deviation to the position controller 31c.

The position controller 31c generates a speed command value based on the angular deviation sent from the subtractor 31b, by arithmetic processing based on a transfer function and a proportional coefficient set in advance. The position controller 31c sends the generated speed command value to the subtractor 31e.

The differentiator 31d differentiates the present positional value detected by the rotation sensor E to generate an amount of change in the rotational angle of the drive motor M per unit time, that is, a present speed value. The differentiator 31d sends the generated present speed value to the subtractor 31e.

The subtractor 31e subtracts the present speed value sent from the differentiator 31d, from the speed command value sent from the position controller 31c so as to generate a speed deviation. The subtractor 31e sends the generated speed deviation to the speed controller 31f.

The speed controller 31f generates a torque command value (current command value) based on the speed deviation sent from the subtractor 31e, by arithmetic processing based on a transfer function and a proportional coefficient set in advance. The speed controller 31f sends the generated torque command value to the subtractor 31g.

The subtractor 31g subtracts a present current value detected by the current sensor C from the torque command value sent from the speed controller 31f, so as to generate a current deviation. The subtractor 31g sends the generated current deviation to the drive motor M so as to drive the drive motor M.

As described above, the operation controlling module 31 controls the drive motor M so as to control the slave arm 1 to perform the operation corrected from the operation based on the automatic operation information. Note that when the operation mode of the slave arm 1 is the automatic mode, the positional command value based on the automatic operation information is sent to the subtractor 31b. When the operation mode of the slave arm 1 is the manual mode, a positional command value based on the manipulation information is sent to the subtractor 31b.

When the slave arm 1 performs the corrected operation, the storage device 4 automatically stores the corrected operation information which causes the slave arm 1 to perform the corrected operation, as the automatic operation information 41. However, when the slave arm 1 performs the corrected operation, the storage device 4 may be selectable of whether to store the corrected operation information as the automatic operation information 41. In this case, for example, after the slave arm 1 finishes the corrected operation, the control device 3 may inquire to the input device 2 whether to store the corrected operation.

In the subsequent operation, the operation controlling module 31 can use as the automatic operation information the corrected operation information stored in the storage device 4 as the automatic operation information 41. In this embodiment, the operation controlling module 31 controls the operation of the slave arm 1 using the latest automatic operation information 41 stored in the storage device 4 as the automatic operation information. Note that, instead of using, as the next automatic operation information, the corrected operation information to which the corrective manipulation is fully reflected, corrected operation information to which a part of or a given rate of the corrective manipulation is reflected may be used as the next automatic operation information.

(Correcting Processing of Automatic Operation Information)

Below, a concrete example of correcting the operation of the slave arm 1 by the robot system 100 is described with reference to FIGS. 4A to 4C. In this example, the slave arm 1 grips a workpiece 61 formed with a hole 61a to bring the workpiece 61 such that the hole 61a thereof is fitted onto a pin 62 fixed to a given position.

Figure 4A:
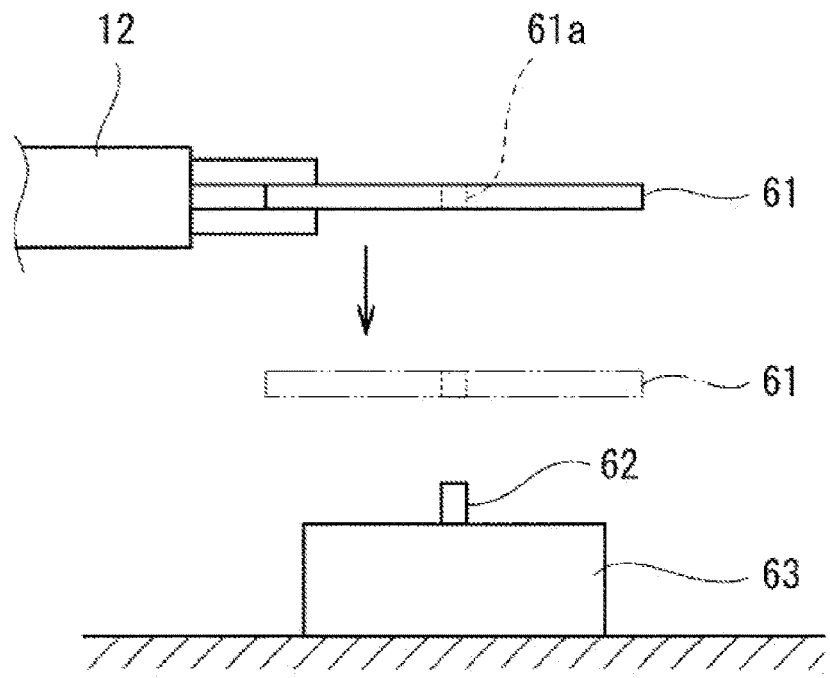
FIG. 4A is a view illustrating an example of operation of a hand part of the robot system according to this embodiment.

FIG. 4A is a view illustrating an operation example of a hand part of the robot system according to this embodiment. As illustrated in FIG. 4A, the pin 62 is provided to a frame 63 of a certain product, and the frame 63 is fixed to a floor of a factory. The pin 62 projects vertically upwardly from the frame 63. Moreover, the workpiece 61 is a bracket in a flat-plate shape, which is to be attached to the frame 63. A hand part 12 which grips the workpiece 61 is attached as the end effector to the wrist part 14 of the slave arm 1. The workpiece 61 is held by the hand part 12 of the slave arm 1.

In this work, for example, the operator manipulates the master arm 70 in the manual mode in advance to operate the slave arm 1 so that the operation controlling module 31 creates the automatic operation information 41 (the teaching information 41a) and the storage device 4 stores it.

Figure 4B:
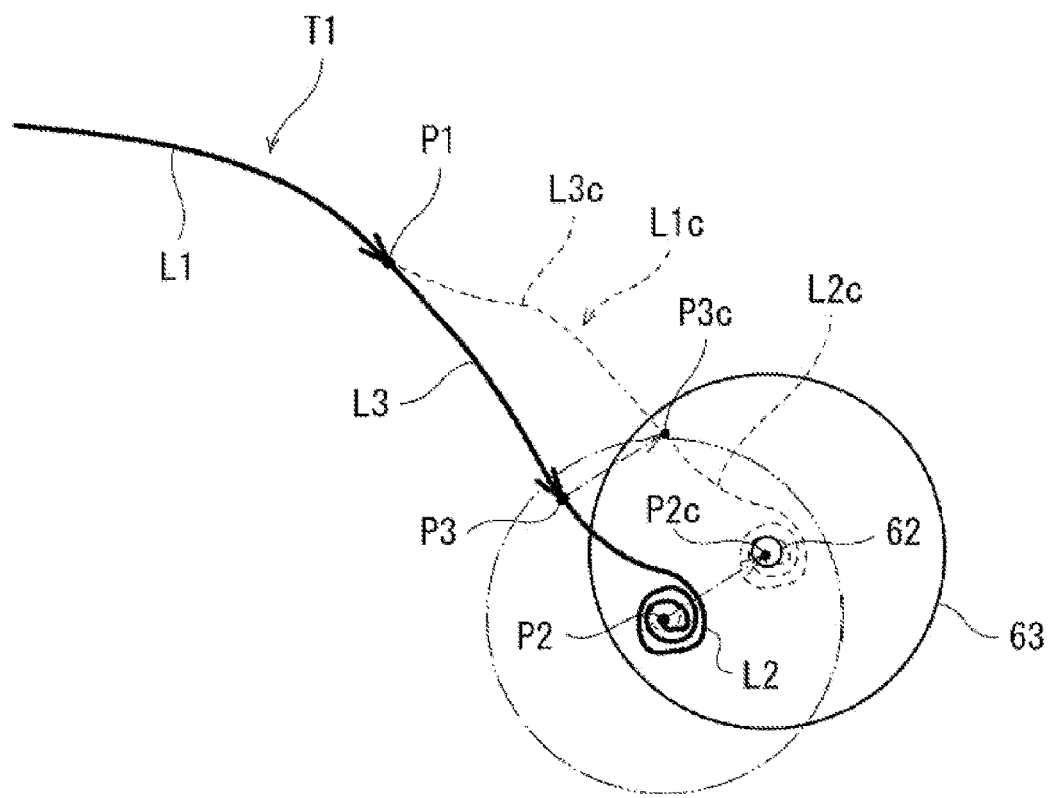
FIG. 4B is a view illustrating an operation path of the hand part illustrated in FIG. 4A based on automatic operation information.
Figure 4C:
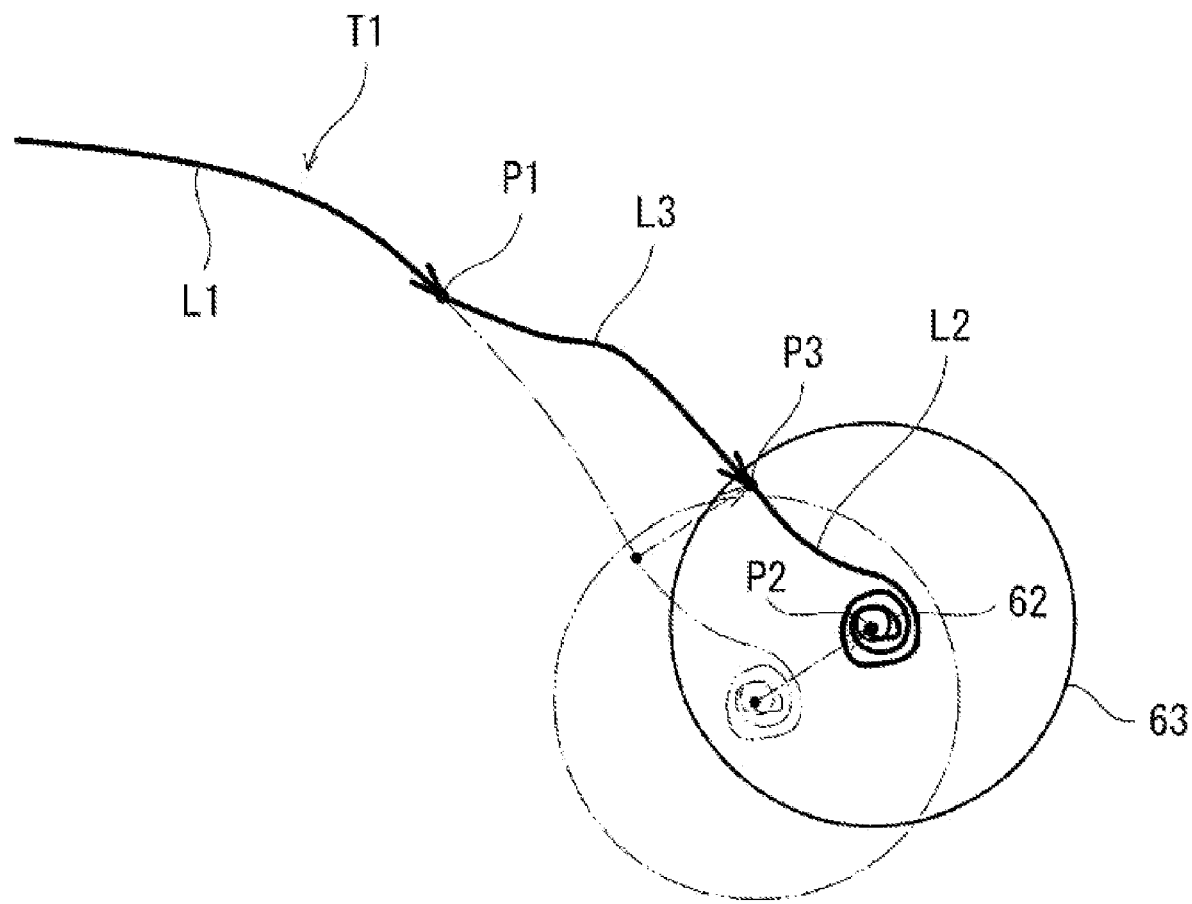
FIG. 4C is a view illustrating one example of an operation path after the change in the reference position in FIG. 4B.

FIG. 4B is a view illustrating one example of the operation path of the hand part 12 illustrated in FIG. 4A based on the automatic operation information, and FIG. 4C is a view illustrating one example of an operation path after the change in the reference position in FIG. 4B. Illustration of the hand part 12 and the workpiece 61 is omitted in FIGS. 4B and 4C. In the correctable automatic mode, the operation controlling module 31 controls the slave arm 1 so that the hand part 12 moves along an operation path T1 unless the corrective manipulation by the master arm 70 (the manipulator) is performed. Note that in FIG. 4B the operation path T1 indicates a position of the hole 61a of the workpiece 61 gripped by the hand part 12.

The operation path T1 in this work process includes a first section L1, a second section L2, and a third section L3. The first section L1 is an operational section (moving section) in which the hand part 12 grips the workpiece 61 and moves it to a given first position P1 near a vicinity area of the frame 63 (the work range).

The second section L2 is an operational section (a working section) including a second position P2 provided downstream of the first position P1 in a moving direction and which serves as a reference position of the operation of the slave arm 1 (the hand part 12) for performing the work process. The operational position of the hand part 12 in the second section L2 is defined based on the reference position. In this embodiment, the second position P2 is a position (a position of the pin 62) where the fitting of the hole 61a of the workpiece 61 onto the pin 62 is finished. Moreover, a start position of the second section L2 is a third position P3. The third position P3 is located between the first position P1 and the second position P2 in the moving direction on the operation path T1. Therefore, the second section L2 is a given operational section on the operation path T1 from the third position P3 and including the second position P2 (the operational section from the third position P3 to the second position P2 in FIG. 4B).

In the second section L2, a contouring operation (or a groping operation) is performed to make the fitting of the hole 61a of the workpiece 61 onto the pin 62 easier. The contouring operation or a contour-tracking operation is an operation in which the workpiece 61 is moved closer to a tip-end part of the pin 62 while circling around the pin 62 near the tip-end part of the pin 62 (near the second position P2). According to such a contouring operation, the pin 62 can be efficiently fitted into the hole 61a of the workpiece 61 while an increase in a load generated when an edge of the hole 61a of the workpiece 61 contacts the pin 62 is suppressed. Moreover, even when the second position P2 does not fully match the position of the pin 62, the fitting work can be achieved. Such a contouring operation is incorporated in the automatic operation information 41 by an expert manipulating the master arm 70 in the manual mode to teach the slave arm 1 to operate.

The third section L3 is an operational section (a connecting section) which connects the first section L1 to the second section L2. That is, the third section L3 is a section on the operation path T1 from the first position P1 to the third position P3. The automatic operation information 41 includes positional information on the first position P1, the second position P2, and the third position P3. Moreover, the automatic operation information 41 may include the postures of the slave arm 1 and/or the hand part 12 at the positions P1-P3.

Figure 5:
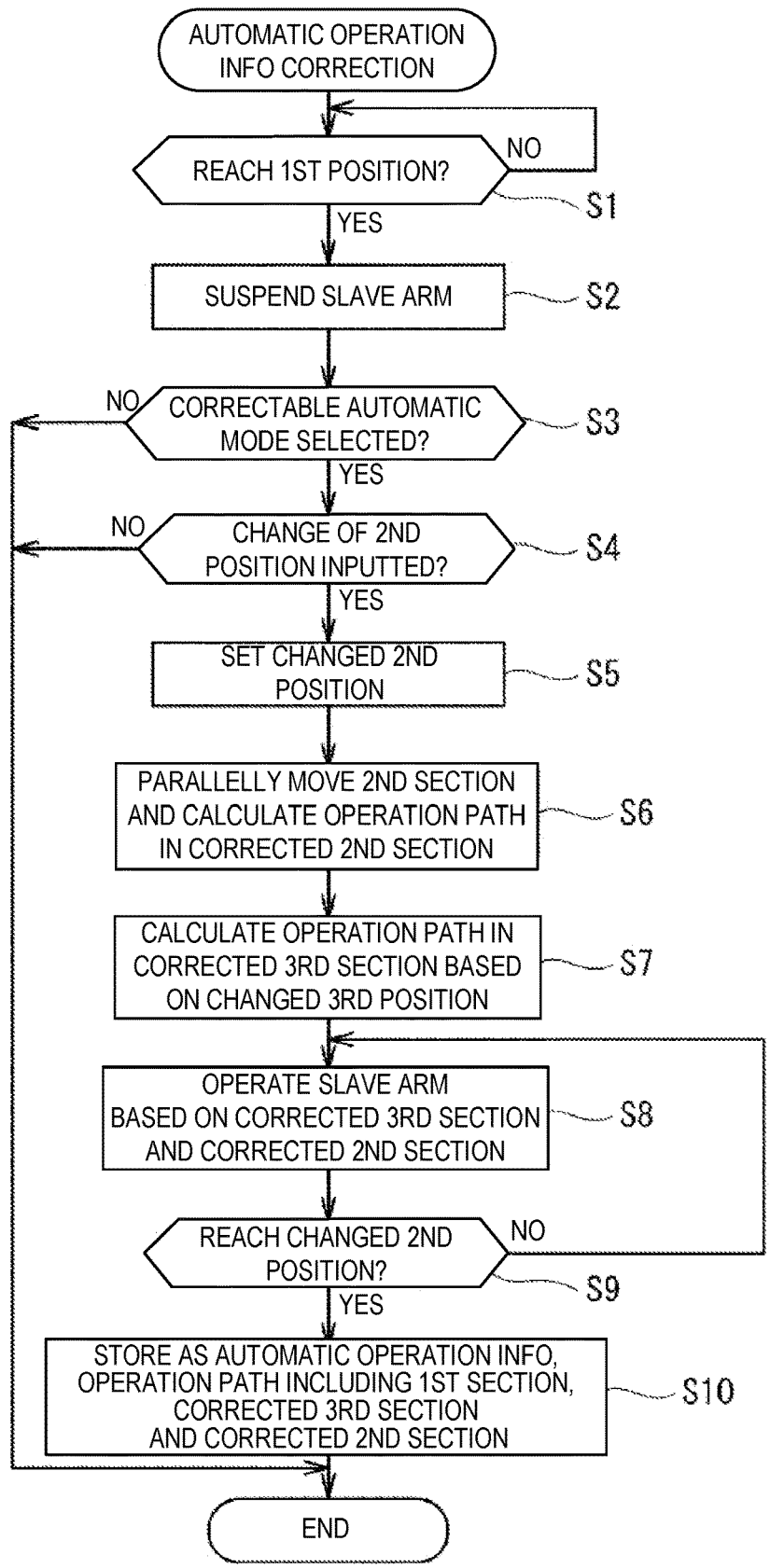
FIG. 5 is a flowchart illustrating a flow of a correcting processing of the automatic operation information based on the change in the reference position according to this embodiment.

FIG. 5 is a flowchart illustrating a flow of a correcting processing of the automatic operation information based on the change in the reference position according to this embodiment. When the work process is performed in the correctable automatic mode or the automatic mode, the operation controlling module 31 operates the slave arm 1 based on the automatic operation information 41. When the corrective manipulation by the master arm 70 is performed during the operation in the correctable automatic mode, the operation path T1 is corrected based on the corrective manipulation so as to generate the corrected operation information, and the slave arm 1 is operated based on the corrected operation information. The positions P1-P3 may also be changed by the corrective manipulation. In the next work process, the operation controlling module 31 operates the slave arm 1 based on the generated corrected operation information as the automatic operation information 41. That is, the hand part 12 is controlled to move on the corrected operation path T1.

In the automatic mode or the correctable automatic mode, the operation controlling module 31 moves the hand part 12 (the slave arm 1) from an operation start position toward the first position P1, and determines whether the hand part 12 reaches the first position P1 (Step S1). If the hand part 12 reaches the first position P1 (Step S1: YES), the operation controlling module 31 temporarily stops the slave arm 1 at the first position P1 (Step S2). Note that also in the manual mode, when the hand part 12 reaches the first position P1, the operation controlling module 31 may temporarily stop the slave arm 1 at the first position and execute the subsequent operation control.

During the temporary stop of the slave arm 1, the operation controlling module 31 sends to the input device 2 the information on the operation mode and mode-change inquiring information which inquires whether the change in the operation mode is required. The input device 2 receives the mode-change inquiring information, and accepts from the operator a manipulation for selecting the operation mode through the mode selecting part 71. When a manipulation for switching the operation mode (including a manipulation to retain the operation mode) is performed through the mode selecting part 71, operation mode input information is sent from the input device 2 to the operation controlling module 31. The operation controlling module 31 executes the operation control downstream of the first position P1 in the operation mode corresponding to the received operation mode input information.

For example, the slave arm 1 is operated in the automatic mode on the operation path T1 from a process start position (not illustrated) which is a position of the hand part 12 before gripping the workpiece 61, to the first position P1 after gripping the workpiece 61. After that, by the operation mode being switched, the slave arm 1 can be operated in the correctable automatic mode from the first position P1 to the second position P2.

The operation controlling module 31 determines whether the correctable automatic mode is selected (Step S3). That is, the operation controlling module 31 determines whether the operation mode included in the operation mode input information received from the input device 2 is the correctable automatic mode. If the correctable automatic mode is selected at the first position P1 (Step S3: YES), the operation controlling module 31 makes positional coordinates of the second position P2, which is the reference position, changeable from the second position P2 in the automatic operation information. In more detail, the operation controlling module 31 sends to the input device 2 reference-position-change inquiring information which inquires whether the positional change in the reference position (the second position P2) is required. The input device 2 receives the reference-position-change inquiring information, and accepts from the operator an inputting manipulation for changing the reference position through the reference position inputting part 73 (Step S4). When an inputting manipulation for changing the reference position is performed through the reference position inputting part 73, the input device 2 sends changed positional information on the reference position to the operation controlling module 31 as the corrective manipulation information.

For example, when the input device 2 is provided with a display screen, an image of the work range (near the installed location of the pin 62) is captured by the camera 51 from above, and the captured image (an image in the plan view) is displayed on the display screen. The coordinate information, which serves as the reference of the operation of the slave arm 1, is associated with the plan view image, and markers indicating the first position P1 and the second position P2 based on the automatic operation information are displayed on the plan view image. That is, an image similar to FIG. 4B is displayed on the display screen. Moreover, the operation path T1 may be displayed to be superimposed on the plan view image.

The reference position inputting part 73 is configured so that the operator is inputtable of the setting of the reference position at a desired position on the display screen. For example, the reference position inputting part 73 may be comprised of a touch panel which is inputtable by the display screen being touched. In this case, the desired position (e.g., the position of the pin 62) on the plan view image displayed on the display screen is touched and inputted, and accordingly, corresponding positional coordinates are generated as the changed positional information on the reference position. Alternatively, the reference position inputting pat 73 may be configured so that an inputting cursor displayed movably on the plan view image on the display screen is moved by a manipulating part, such as a lever, and a select button etc., is pressed at the desired position, and accordingly, the corresponding positional coordinates are generated as changed positional coordinates of the reference position.

A described above, since the contouring operation is performed in the second section L2 on the operation path T1 based on the automatic operation information, the hole 61a of the workpiece 61 can be fitted onto the pin 62 even when the positions of the second position P2 and the pin 62 do not fully match with each other. However, placed positions of the frames 63 each provided with the pin 62 may be deviated by a unit group, due to the change in the production lot of the frames 63, the change in a manufacturer of the frames 63, etc. As a result, for example as illustrated in FIG. 4B, the pin 62 may not be located within the range of the contouring operation in the second section L2. In such a case, the slave arm 1 may not be able to perform an appropriate work only by the contouring operation. Moreover, even when the fitting work is possible, an average period of time required for the fitting may increase, thus degrading the work efficiency.

Therefore, when the reference position of the work based on the automatic operation information deviates to some extent from an actual reference position during the repetitive work to each of the plurality of products, the reference position is required to be changed. However, when the reference position is changed simply by manipulating the master arm 70 in the correctable automatic mode, it may affect the operation (e.g., contouring operation) which can be taught only by the expert, and thus, the work efficiency may degrade.

In this regard, according to this embodiment, when the positional coordinates of the second position P2, which serve as the reference position for the operation of the slave arm 1, are changed to a second position P2c, the operation controlling module 31 corrects the automatic operation information 41 so that the slave arm 1 reaches the changed second position P2c while retaining some of the elements in the automatic operation information in the correctable automatic mode.

In more detail, if the operation controlling module 31 receives the changed positional information (corrective manipulation information) based on the inputting manipulation for changing the reference position through the reference position inputting part 73 (Step S4: YES), the operation controlling module 31 sets the positional coordinates of the second position P2, which serve as the reference position of the operation of the slave arm 1, to the second position (hereinafter, referred to as a "changed second position") P2c based on the changed positional information (Step S5).

Moreover, when the positional coordinates of the second position P2 are changed, the operation controlling module 31 executes a corrected-operational-section calculating processing in which an operation path in the operational section from the third position P3 (the second section L2) on the operation path T1 of the slave arm 1 based on the automatic operation information, is calculated. In more detail, the operation controlling module 31 calculates an operation path in a corrected second section L2c by parallelly moving the second section L2 according to the change in the second position from P2 to P2c (Step S6). As a result, the corrected second section L2c is corrected so that positional coordinates of an arbitrary operational position in the corrected second section L2c from a changed third position P3c and including the changed second position P2c, are displaced from the corresponding operational position in the second section L2 before the correction, by the same amount as a positional deviation (direction and distance) between the second position P2 and the changed second position P2c.

Moreover, the operation controlling module 31 calculates an operation path in a corrected third section L3c from the first position P1 to the changed third position P3c based on positional coordinates of the changed third position P3c (Step S7). The operation controlling module 31 preferably calculates the corrected third section L3c which smoothly connects the first section L1 to the corrected second section L2c, based on the information on the positional coordinates of and the posture at the first position P1, and the information on the positional coordinates of and the posture at the changed third position P3c. A corrected operation path T1c from the first position P1, which is corrected as described above, connects the corrected third section L3c to the corrected second section L2c.

After the calculation of the corrected operation path T1c, the operation controlling module 31 operates the slave arm 1 (the hand part 12) to move from the first position P1 toward the changed second position P2c via the changed third position P3c based on the corrected operation path T1c (the corrected third section L3c and the corrected second section L2c) (Step S8). The operation controlling module 31 determines whether the slave arm 1 reaches the changed second position P2c (Step S9).

If the slave arm 1 reaches the changed second position P2c (Step S9: YES), the operation controlling module 31 ends the operation in this work process, and stores in the storage device 4 the corrected operation information including the operation path connecting the first section L1 on the operation path T1 based on the automatic operation information 41, and the corrected operation path T1c (the corrected third section L3c and the corrected second section L2c), as the automatic operation information 41 for the next work process (Step S10). As a result, in the next work process, the operation path T1 based on the automatic operation information 41 is set as illustrated in FIG. 4C, where the changed second position P2c is set as the second position P2, the changed third position P3c is set as the third position P3, the corrected third section L3c is set as the third section L3, and the corrected second section L2c is set as the second section L2.

According to this configuration, the operation of the slave arm 1 can be corrected in real time based on the corrective manipulation by the input device 2 during the operation of the slave arm 1 (the robot body) based on the automatic operation information 41. Moreover, only by the positional coordinates of the changed second position P2c being specified as the corrective manipulation, the operation of the slave arm 1 can be corrected so that the slave arm 1 reaches the specified changed second position P2c while some of the elements (the contour of the second section L2) in the original automatic operation information 41 are retained. Since the some elements of the original automatic operation information 41 are retained, the slave arm 1 can be operated to locate at the desired second position P2c while a principal motion of the slave arm 1 including tips for manipulation carried out by the expert during the teaching, is succeeded or taken over. As a result, the operation of the slave arm 1 set in advance can be corrected easily and appropriately.

Moreover, in this embodiment, the second position P2 which can be specified to be changed, is set as the reference position for the work in which the slave arm 1 brings the hole 61a of the workpiece 61 to fit onto the pin 62 provided to the frame 63. Therefore, even when the installed position of the frame 63 provided with the pin 62 is changed due to the lot change etc., the work position is changed while the principal motion of the slave arm 1 can be prevented from being changed. As a result, the operation efficiency of the slave arm 1 can be prevented from being degraded due to the positional adjustment.

Moreover, in this embodiment, when the positional coordinates of the second position P2 are changed, the slave arm 1 operates in the corrected second section L2c, which is the working section on the operation path T1 where the fitting work is performed, while the contour of the original second section L2 is retained. Therefore, even when the positional coordinates of the second position P2 are changed, the contour of the operation path (the corrected second section L2c) of the slave arm 1 in the given operational section from the changed third position P3c and including the changed second position P2c, reproduces the original operation path (the second section L2). As a result, the principal motion of the slave arm 1 can be easily succeeded.

Note that when the corrective manipulation information based on the corrective manipulation by the master arm 70 etc., is inputted to the operation controlling module 31 during the operation of the slave arm 1 in the second section L2, the operation controlling module 31 generates the corrected operation information in which the operational position in the second section L2 is corrected based on the corrective manipulation information, and operates the slave arm 1 based on the corrected operation information. That is, the operation controlling module 31 permits the corrective manipulation similar to the case when the second position P2 is not changed. Accordingly, the correction of the contouring operation itself as well as the changing in the reference position is possible.

Alternatively, the correctable automatic mode may include a first operation mode in which the corrective manipulation by the master arm 70 etc. with respect to the second section L2 is permitted, and a second operation mode in which the manipulation for changing the position of the second position P2 is permitted while the corrective manipulation of the second section L2 itself is inhibited. The input device 2 may be switchable of these operation modes.

Other Embodiments

Although one embodiment of the present disclosure is described, the present disclosure is not limited to this embodiment, and various improvements, changes, and modifications are possible without departing from the spirit of the present disclosure.

Figure 6:
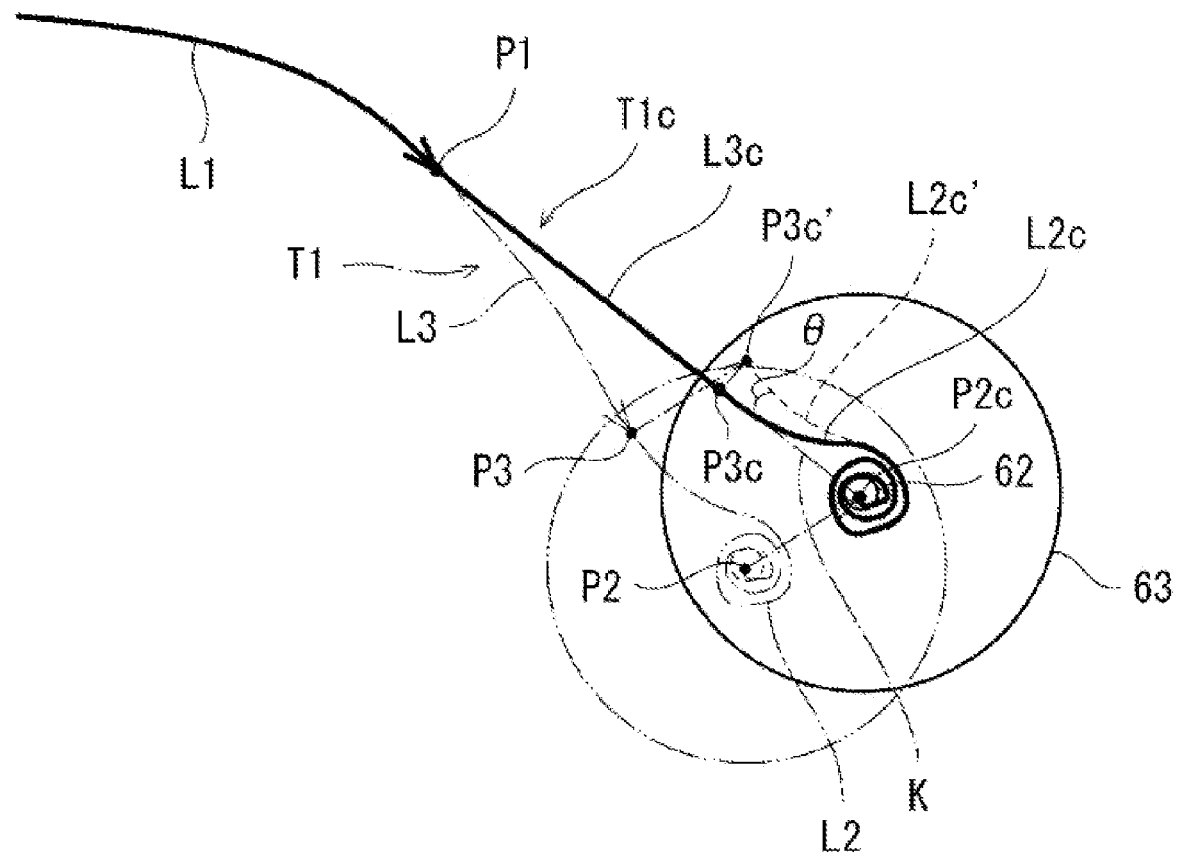
FIG. 6 is a view illustrating another example of the operation path after the change in the reference position from the operation path illustrated in FIG. 4B.

For example, although in the embodiment described above the operation controlling module 31 sets the operation path in the corrected second section L2c by parallelly moving the second section L2 according to the change in the second position from P2 to P2c, a given processing may be additionally executed after this parallel movement. FIG. 6 is a view illustrating another example of the operation path after the change in the reference position from the operation path illustrated in FIG. 4B.

Also in FIG. 6, the operation controlling module 31 parallelly moves the second section L2 according to the change in the second position from P2 to P2c as the corrected-operational-section calculating processing (Step S6). The operational section in which the operation path is calculated at this time is referred to as a "parallelly-moved second section L2c'." Then, the operation controlling module 31 sets an imaginary line K connecting the first position P1 to the changed second position P2c, and rotates the parallelly-moved second section L2c' centering on the changed second position P2c so that a third position P3c' in the parallelly-moved second section L2c' is located on the imaginary line K.

The operation controlling module 31 sets the position on the imaginary line K corresponding to the third position P3 as the changed third position P3c, and sets the operational section between the changed third position P3c and the changed second position P2c as the corrected second section L2c. Then, similarly to the embodiment described above, the operation controlling module 31 calculates the operation path in the corrected third section L3c from the first position P1 to the changed third position P3c, based on the positional coordinates of the changed third position P3c (Step S7).

As described above, by the second section L2 being rotated as well as being parallelly moved according to the positional change in the second position P2, the operation path in the corrected third section L3c between the first position P1 and the changed third position P3c can be smoother (the first section can be connected to the corrected second section L2c more smoothly).

As described above, the corrected-operational-section calculating processing to the second section L2 is not limited to the embodiment described above, but various modes can be adopted. For example, the corrected-operational-section calculating processing may include processing by which the contours of the second section L2 before and after the change become congruent shapes, including one of the parallelly moving processing, the rotating processing, and a mirroring processing. In addition or alternative to this, the corrected-operational-section calculating processing may include processing by which the contours of the second section L2 before and after the change become similar shapes, including enlarging and reducing processing. For example, processing may be executed so that an enlargement ratio increases as a positional deviation (distance) between the second positions P2 before and after the change increases, each of which serves as the reference position in the positional change.

Moreover, although in the embodiment, as illustrated in FIG. 4B etc., the second position P2 which serves as the reference position in the positional change is set at the finish position of the given work, the second position P2 is not limited to such a position. For example, the second position P2 may be set at a start position (a position immediately before the start) of the given work.

Figure 7A:
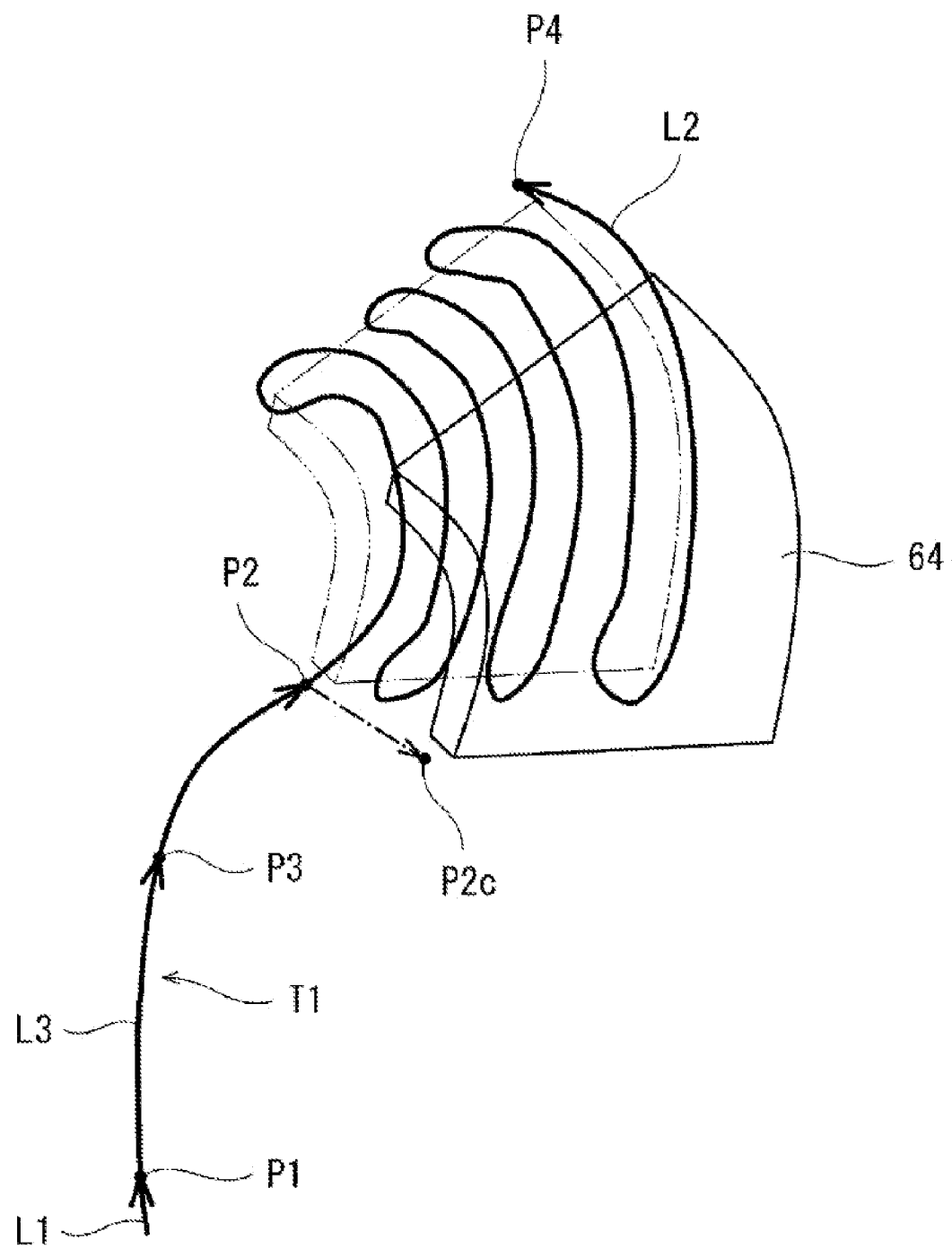
FIG. 7A is a view illustrating an operation path based on automatic operation information of a hand part according to a modification of this embodiment.
Figure 7B:
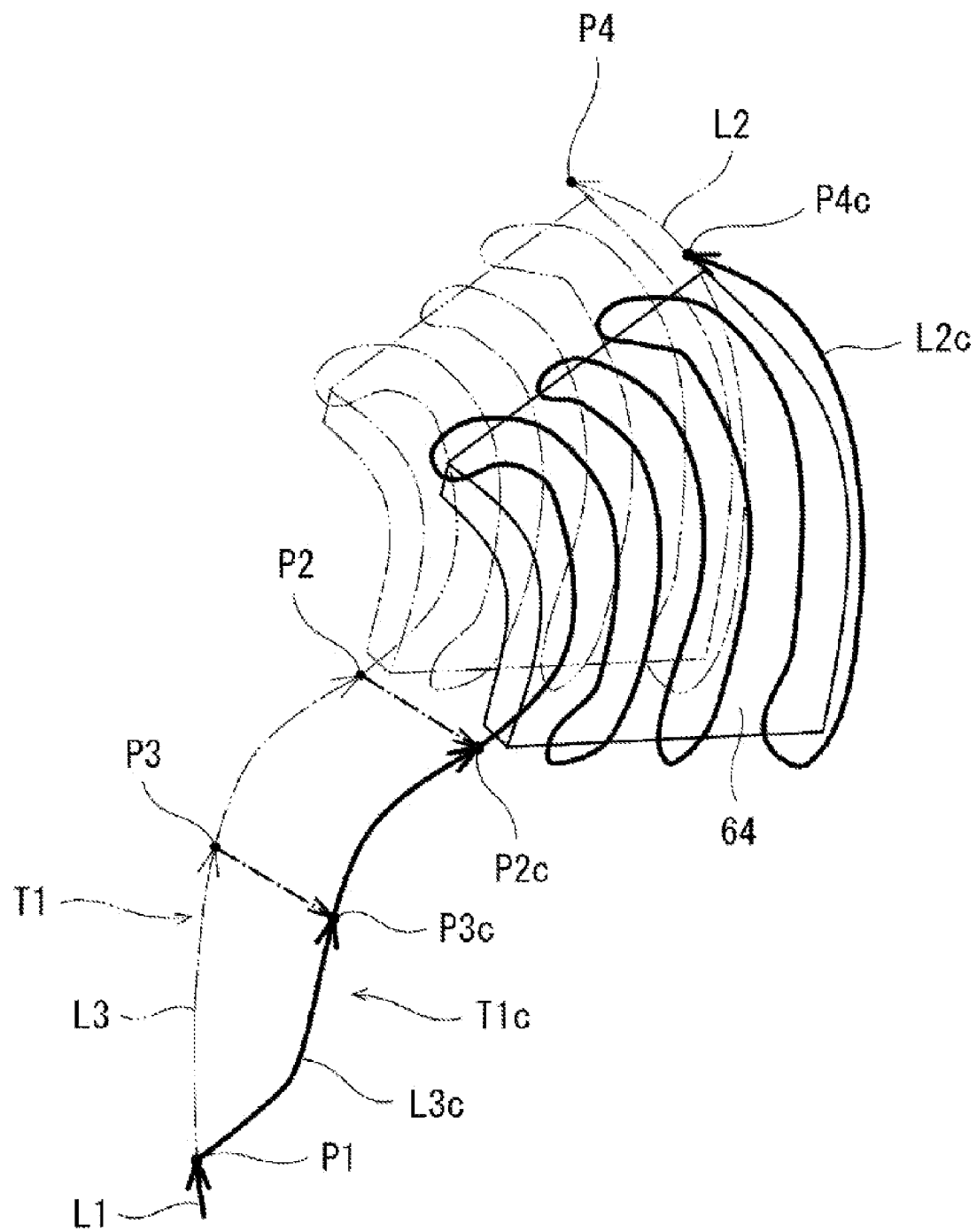
FIG. 7B is a view illustrating one example of the operation path after the change in the reference position illustrated in FIG. 7A.

FIG. 7A is a view illustrating an operation path based on automatic operation information of a hand part according to a modification of this embodiment. FIG. 7B is a view illustrating an example of the operation path after the change in the reference position illustrated in FIG. 7A. In this modification, a painting process in which the slave arm 1 is used to paint a surface of a workpiece 64 having a curved surface is described. In this modification, a nozzle (not illustrated) which injects paint is attached to the hand part 12 of the slave arm 1.

The automatic operation information 41 in this work processing includes reciprocating operation to paint the surface of the workpiece 64 in a second section L2. The surface of the workpiece 64 has a curved surface curving from an upper-end part to a lower-end part. The reciprocating operation includes an operation of moving laterally while reciprocating between the upper-end part and the lower-end part, and an operation of moving around backward from the surface of the workpiece 64 at the upper-end part and the lower-end part. Among these operations, the operation moving around backward from the surface of the workpiece 64 at the upper-end part and the lower-end part requires the teaching by the expert.

In this modification, the second position P2 as the reference position of the work is set at the position before (immediately before) the painting to the workpiece 64. Therefore, the second section L2 on the operation path T1 is set to a section from a third position P3 upstream of a second position P2 in the moving direction, to a fourth position P4 after finishing the painting work via the second position P2.

Also in this modification, the operation controlling module 31 controls the operation of the slave arm 1 similarly to the embodiment described above. That is, when the correctable automatic mode is selected at the first position P1, and the inputting manipulation for changing the second reference position P2, which is the reference position, is performed, the operation controlling module 31 corrects, in the correctable automatic mode, the automatic operation information 41 so that the slave arm 1 reaches a changed second position P2c while the operation in the second section L2, which is an element in the automatic operation information, is retained.

Also in this modification, similarly to the embodiment, the operation controlling module 31 calculates the operation path in a corrected second section L2c (FIG. 7B) as the corrected-operational-section calculating processing by parallelly moving the second section L2 according to the change in the second position from P2 to the P2c. In this modification, according to this processing, the operational position in the section from the third position P3 to the fourth position P4 based on the automatic operation information is parallelly moved, and the section from the changed third position P3c to the changed fourth position P4c is generated as the corrected second section L2c. Moreover, the operation controlling module 31 calculates the operation path in the corrected third section L3c from a first position P1 to the changed third position P3c based on the positional coordinates of the changed third position P3c. The corrected operation path T1c from the first position P1 corrected as described above connects the corrected third section L3c to the corrected second section L2c.

Alternatively, the second position P2, which is the reference position in the positional change, may be set to a location other than the reference position related to the work. For example, the second position P2 may be set at a midpoint position in a process of moving from an A-point to a B-point, or may be set at a position separated from the A-point or the B-point by a given distance (or a given time period).

Moreover, although in the embodiment and the modification the some retained elements are the moving positions of the tip-end part (the hand part 12) of the robot body (the slave arm 1), it is not limited to this. For example, in addition or alternative to this, the posture, the speed, etc., of the hand part 12 at each moving position may be retained. Moreover, the method of changing the second position P2 is not limited to that in the embodiment, but various methods, such as inputting coordinates using the input device 2, are applicable. Moreover, the positional coordinates of the changed second position P2 may be plane coordinates or three-dimensional coordinates. Moreover, the posture of the hand part 12 at the changed second position P2 may be inputtable.

Moreover, although in the embodiment and the modification the some retained elements of the original automatic operation information 41, when the second position P2 is changed, are the contouring operation and the reciprocating operation for the painting, respectively, it is not limited to this. For example, the some elements may include information on the postural change in a partial section in the operation path T1 of an avoiding operation to avoid a given obstacle, the rotating operation, a helically moving operation, the reciprocating operation, and an operation suitably combining any of these operations.

Moreover, the some elements may not be serial elements. For example, in a work process including a first section where a given reciprocating operation is performed, a second section where a given helically moving operation is performed, and a third section connecting the first section to the second section, when a start position of the first section is changeable as the reference position (the second position P2), the operations in the first section and the second section may be retained and the operation (the operation path) in the third section may be changed according to the change in the reference position.

Moreover, although in the embodiment the robot system 100 utilizing the master-slave robot is described, the present disclosure is applicable to a robot system other than the master-slave robot system. For example, the manipulator which performs the corrective manipulation in the correctable automatic mode may not include the master arm 70.

For example, instead of the master arm 70, a correcting position inputting part may be provided as the input device 2, which is changeable of, based on a manipulation by the operator, the operational position of the operating slave arm 1 on the operation path T1 based on the automatic operation information. The corrective position inputting part is configured to be manipulatable, and may be comprised of a directional switch, a control lever, or a portable terminal such as a tablet. When the operator inputs to manipulate in a given direction using such a corrective position inputting part, the corrective manipulation information for performing the positional correction of the slave arm 1 in the given direction from the operational position by an amount corresponding to a period of the manipulating input, or an amount of the manipulating input, is generated. Also according to this configuration, effects similar to the embodiment described above can be achieved.

Moreover, although in the embodiment described above, the manipulators, such as the mode selecting part 71 and the operation information selecting part 72, provided to the single input device 2, they may be provided to separate input devices.

INDUSTRIAL APPLICABILITY

The present disclosure is useful for providing a robot system, capable of easily and appropriately correcting an operation of a robot set in advance.

DESCRIPTION OF REFERENCE CHARACTERS

1 Slave Arm (Robot Body)
4 Storage Device (Memory)
31 Operation Controlling Module
41 Automatic Operation Information
70 Master Arm (Manipulator)
73 Reference Position Inputting Part (Manipulator)
100 Robot System

What is claimed is:

1. A robot system, comprising:
a robot body;
a memory configured to store automatic operation information for causing the robot body to perform a given operation;
an operation controlling module configured to control the operation of the robot body based on the automatic operation information; and
a manipulator configured to generate corrective manipulation information based on a corrective manipulation for correcting the operation of the robot body under operation based on the automatic operation information,
wherein the operation controlling module selects, based on an input from the manipulator, an operation mode to be executed from a plurality of operation modes including an automatic mode in which the robot body is controlled based on the automatic operation information, and a correctable automatic mode in which the corrective manipulation information is acquired and the robot body is controlled to perform a corrected operation based on the corrective manipulation information,
wherein the memory stores corrected operation information based on the corrected operation as the next automatic operation information,
wherein the automatic operation information includes an operation path of the robot body, positional information on a first position on the operation path and a second position provided downstream of the first position in a moving direction and configured to serve as a reference position for the operation of the robot body,
wherein the operation path includes a plurality of sections, and
wherein the operation controlling module is adapted to:
stop the robot body and receive a selecting manipulation of the operation mode from the manipulator when the robot body is located at the first position;
make positional coordinates of the second position changeable from the second position in the automatic operation information when the correctable automatic mode is selected at the first position; and
correct, while in the correctable automatic mode, when the positional coordinates of the second position are changed, the automatic operation information so that the robot body reaches the changed second position while retaining a contour of a first section of the plurality of sections of the operation path included in the automatic operation information.

2. The robot system of claim 1, wherein the second position is set as a reference position for the robot body performing a given work to a given workpiece.

3. The robot system of claim 2, wherein the automatic operation information includes positional information on a third position located between the first position and the second position on the operation path in the moving direction,
wherein the operation controlling module executes, when the positional coordinates of the second position are changed, a corrected-operational-section calculating processing in which the first section of the operation path is calculated, and
wherein the corrected-operational-section calculating processing includes parallelly moving the first section, which is from the third position to the second position on the operation path, based on the change in the second position.

4. The robot system of claim 1, wherein the robot body includes a slave arm, and the manipulator includes a master arm installed outside a work range of the slave arm.

* * * * *